US010118575B2

(12) United States Patent
Tanigawa et al.

(10) Patent No.: US 10,118,575 B2
(45) Date of Patent: Nov. 6, 2018

(54) IN-VEHICLE POWER SUPPLY DEVICE AND VEHICLE HAVING IN-VEHICLE POWER SUPPLY DEVICE MOUNTED THEREIN

(71) Applicant: Panasonic Intellectual Property Management Co., Ltd., Osaka (JP)

(72) Inventors: Yasutaka Tanigawa, Mie (JP); Shinichi Yamanouchi, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/518,669

(22) PCT Filed: Sep. 24, 2015

(86) PCT No.: PCT/JP2015/004837
§ 371 (c)(1),
(2) Date: Apr. 12, 2017

(87) PCT Pub. No.: WO2016/075856
PCT Pub. Date: May 19, 2016

(65) Prior Publication Data
US 2017/0225636 A1    Aug. 10, 2017

(30) Foreign Application Priority Data

Nov. 13, 2014    (JP) ................... 2014-230314

(51) Int. Cl.
*B60R 16/00*    (2006.01)
*B60R 16/033*    (2006.01)
(Continued)

(52) U.S. Cl.
CPC ............ *B60R 16/033* (2013.01); *B60Q 9/00* (2013.01); *B60R 16/005* (2013.01); *H02M 3/155* (2013.01)

(58) Field of Classification Search
CPC ..... B60R 16/005; B60R 16/033; B60L 3/003; B60L 3/0046; B60L 2210/14; H02M 3/155
See application file for complete search history.

(56) References Cited

U.S. PATENT DOCUMENTS 4,025,836 A * 5/1977 Naito .................. B60L 3/003
318/139
5,321,348 A * 6/1994 Vinciarelli ............ H02M 3/156
323/222
(Continued)

FOREIGN PATENT DOCUMENTS

JP    2013-072689    4/2013

OTHER PUBLICATIONS

International Search Report of PCT application No. PCT/JP2015/004837 dated Nov. 17, 2015.

*Primary Examiner* — Frank B Vanaman
(74) *Attorney, Agent, or Firm* — McDermott Will & Emery LLP

(57) ABSTRACT

An in-vehicle power supply device includes a boost converter configured to perform a boosting operation to boost a voltage supplied from an input terminal; a connection-assist diode connected in parallel to the boost converter; and a switch element connected in parallel to the boost converter and the connection-assist diode. A controller detects a voltage output from an output terminal as a first voltage while instructing the switch element to open and instructing the boost converter to stop an operation of the boost converter. After detecting the first voltage of the output terminal, the controller detects a voltage output from the output terminal as a second voltage while instructing the switch element to continuously open and instructing the boost converter to perform the boosting operation. Based on the difference (Continued)

between the first and second voltages, the controller judges whether the boost converter is normal or abnormal.

5 Claims, 4 Drawing Sheets

(51) Int. Cl.
    *B60Q 9/00*         (2006.01)
    *H02M 3/155*      (2006.01)

(56) References Cited

U.S. PATENT DOCUMENTS

| | | | | |
|---|---|---|---|---|
| 6,157,165 A * | 12/2000 | Kinoshita | ............ | H02J 7/0019 320/116 |
| 2003/0048097 A1* | 3/2003 | Ishihara | ............ | G05F 1/567 323/285 |
| 2006/0071557 A1* | 4/2006 | Osawa | ............ | B60L 3/0046 307/10.1 |
| 2009/0236915 A1* | 9/2009 | Yoshida | ............ | H02J 7/0013 307/77 |
| 2010/0120581 A1* | 5/2010 | Mitsutani | ............ | B60L 3/0046 477/7 |
| 2012/0200248 A1* | 8/2012 | Schleser | ............ | B60L 3/003 318/490 |
| 2014/0203786 A1* | 7/2014 | Oosawa | ............ | H02J 7/0031 320/136 |
| 2015/0207410 A1* | 7/2015 | Ono | ............ | B60L 11/1851 307/10.1 |

* cited by examiner

IN-VEHICLE POWER SUPPLY DEVICE AND VEHICLE HAVING IN-VEHICLE POWER SUPPLY DEVICE MOUNTED THEREIN

CROSS-REFERENCE TO RELATED APPLICATIONS

This application is a U.S. national stage application of the PCT international application No. PCT/JP2015/004837 filed on Sep. 24, 2015, which claims the benefit of foreign priority of Japanese patent application No. 2014-230314 filed on Nov. 13, 2014, the contents all of which are incorporated herein by reference.

TECHNICAL FIELD

The present invention relates to an in-vehicle power supply device used for various vehicles, and a vehicle having the in-vehicle power supply device mounted therein.

BACKGROUND ART

FIG. 5 is a circuit block diagram of in-vehicle power supply device 500 in a vehicle having a conventional idling stop function. FIG. 6 is a timing chart of an output voltage of in-vehicle power supply device 500.

A positive electrode side of secondary battery 1 is connected to input terminal 2a of power supply circuit 2 via fuse 3 while output terminal 2b of power supply circuit 2 is connected to load 4. In power supply circuit 2, boost converter 5, connection-assist diode 6, and switch 7 are arranged in parallel and connected to input terminal 2a and output terminal 2b. The anode of connection-assist diode 6 is connected to input terminal 2a of power supply circuit 2 while the cathode of connection-assist diode 6 is connected to output terminal 2b of power supply circuit 2.

Boost converter 5 of power supply circuit 2 boosts up a voltage of secondary battery 1 when a vehicle restarts from an idling stop state so as to allow the vehicle to restart stably. Switch 7 opens only when boost converter 5 performs a boosting operation. In this operation, control device 8 provided in a vehicle controls boost converter 5 and switch 7. Connection-assist diode 6 is provided in power supply circuit 2 in order to prevent a boosted voltage from being supplied to input terminal 2a during a boosting operation of boost converter 5, and to allow secondary battery 1 to supply electric power to load 4 even when switch 7 is broken to open. That is, as long as either connection-assist diode 6 or switch 7 is in a normal state, secondary battery 1 can supply electric power to load 4.

Power supply circuit 2 judges whether boost converter 5 operates normally or not. It is judged, based on an voltage of output terminal 2b during non-boosting and boosting, whether boost converter 5 in power supply circuit 2 operates normally or not. First, for non-boosting, control device 8 stops an operation of boost converter 5 and closes (turns on) switch 7. In this case, control device 8 detects a voltage of output terminal 2b and stores the value of the detected voltage. By contrast, for boosting, control device 8 instructs boost converter 5 to operate and opens (turns off) switch 7. In this case, control device 8 detects the voltage of output terminal 2b, and stores the value of the detected voltage. After that, control device 8 obtains the difference between the value of the voltage of output terminal 2b during the non-boosting and the value of the voltage of output terminal 2b during the boosting. Control device 8 compares the difference with a predetermined threshold V0, and judges whether boost converter 5 operates normally or not.

An in-vehicle power supply device similar to in-vehicle power supply device 500 is disclosed, for example, in PTL 1.

CITATION LIST

Patent Literature

PTL 1: Japanese Patent Laid-Open Publication No. 2013-72689

SUMMARY

An in-vehicle power supply device includes a boost converter configured to perform a boosting operation to boost a voltage supplied from an input terminal; a connection-assist diode connected in parallel to the boost converter; and a switch element connected in parallel to the boost converter and the connection-assist diode. A controller detects a voltage output from an output terminal as a first voltage while instructing the switch element to open and instructing the boost converter to stop an operation of the boost converter. After detecting the first voltage of the output terminal, the controller detects a voltage output from the output terminal as a second voltage while instructing the switch element to continuously open and instructing the boost converter to perform the boosting operation. Based on the difference between the first and second voltages, the controller judges whether the boost converter is normal or abnormal.

The in-vehicle power supply device stably and accurately judges whether the boost converter operates normally or not.

DETAIL DESCRIPTION OF PREFERRED EMBODIMENT

Figure 1:
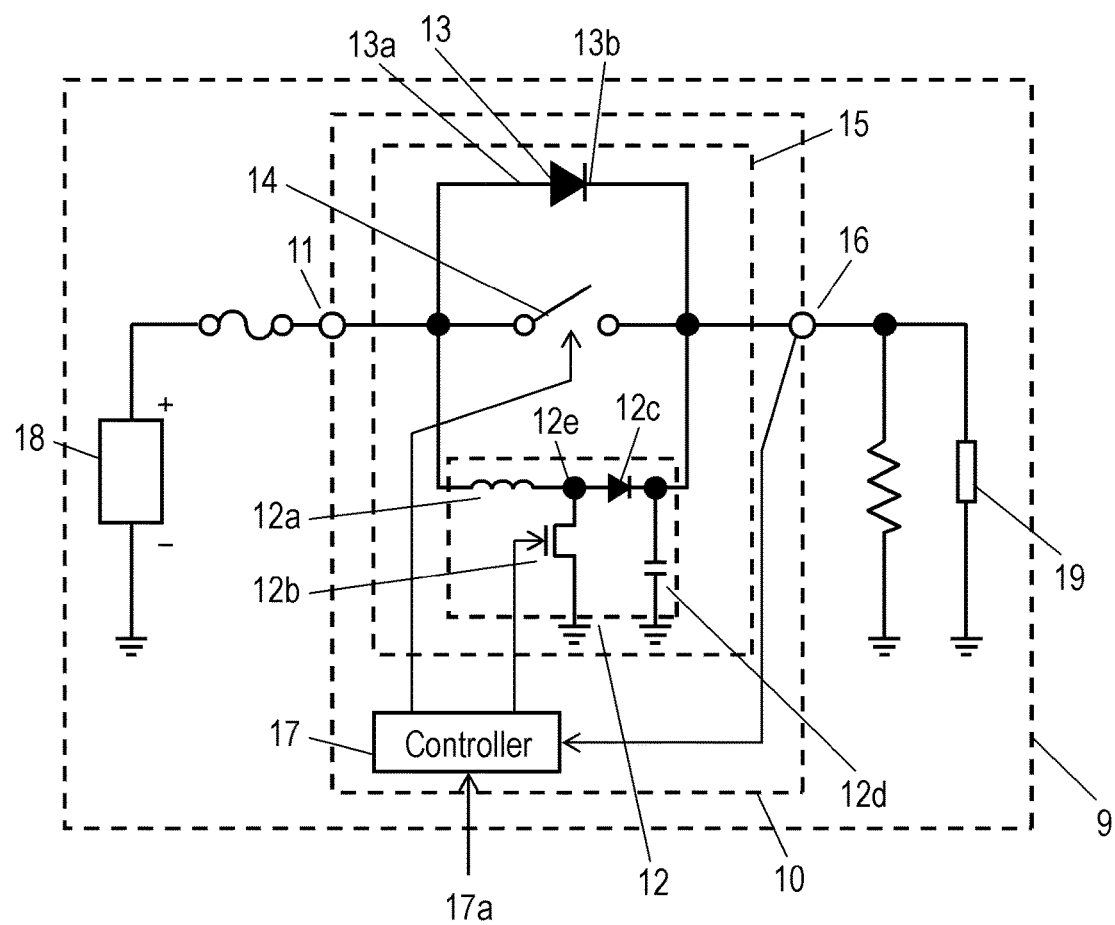
FIG. 1 is a block diagram of an in-vehicle power supply device according to an exemplary embodiment.
Figure 2:
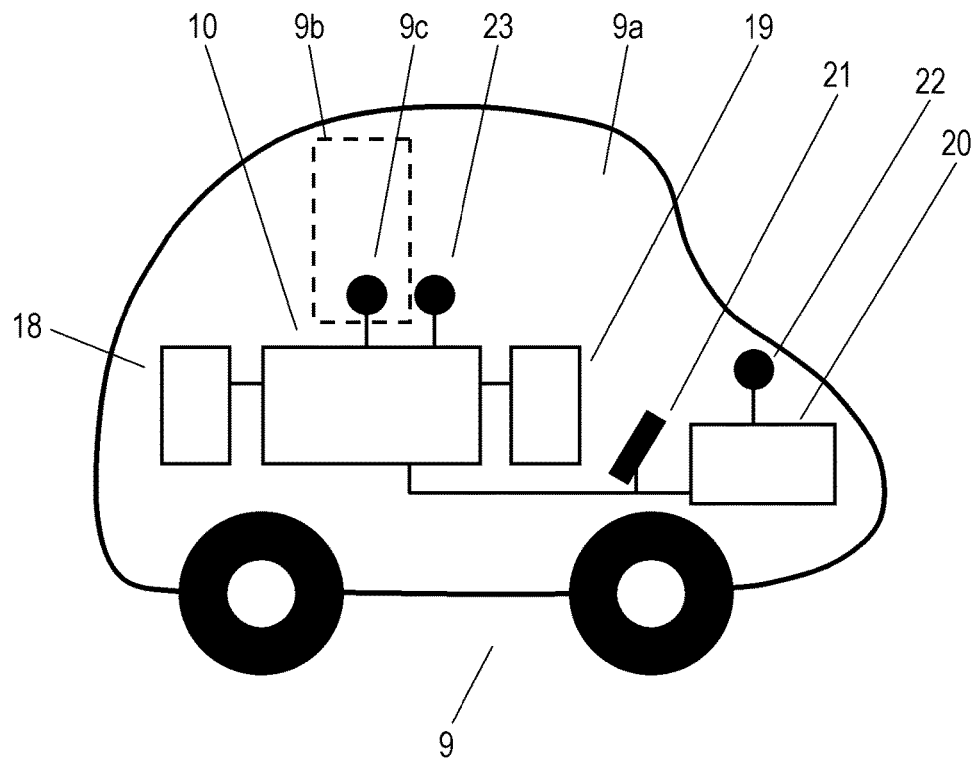
FIG. 2 is a schematic diagram of a vehicle having the in-vehicle power supply device mounted therein according to the embodiment.
Figure 3:
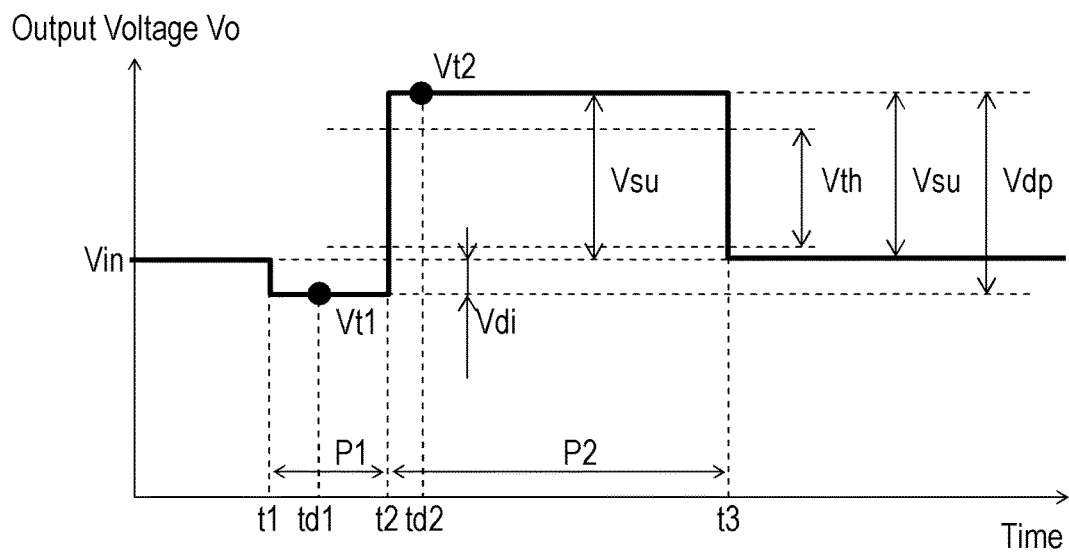
FIG. 3 illustrates an output voltage of the in-vehicle power supply device according to the embodiment.

FIG. 1 is a circuit block diagram of in-vehicle power supply device 10 according to an exemplary embodiment of the present invention. FIG. 2 is a schematic diagram of vehicle 9 having in-vehicle power supply device 10 mounted therein. FIG. 3 illustrates the output voltages of in-vehicle power supply device 10.

In-vehicle power supply device 10 mounted in vehicle 9 includes input terminal 11, power supply circuit unit 15, output terminal 16, and controller 17. In power supply circuit unit 15, boost converter 12, connection-assist diode 13, and switch element 14 are connected in parallel to one another. Output terminal 16 is connected to input terminal 11 via power supply circuit unit 15. Controller 17 detects a voltage of output terminal 16. Controller 17 controls boost converter 12 and switch element 14. Anode 13a of connection-assist diode 13 is connected to input terminal 11 while cathode 13b of connection-assist diode 13 is connected to output terminal 16. Boost converter 12 is connected between input terminal 11 and output terminal 16, and configured to perform a boosting operation to boost a voltage supplied from input terminal 11 and output the boosted voltage through output terminal 16. Connection-assist diode 13 is connected in parallel to boost converter 12 between input terminal 11 and output terminal 16. Switch element 14 is connected in parallel to boost converter 12 and connection-assist diode 13 between input terminal 11 and output terminal 16.

Boost converter 12 includes inductor 12a, switching element 12b, diode 12c, and smoothing capacitor 12d. One end of inductor 12a is connected to input terminal 11. Another end of inductor 12 is connected to node 12e. Switching element 12b is connected between node 12e and a ground. The anode of diode 12c is connected to node 12e while the cathode of diode 12c is connected to output terminal 16. Smoothing capacitor 12d is connected between output terminal 16 and the ground. Controller 17 turns on and off switching element 12b periodically at a predetermined period, thereby causing boost converter 12 to boost an voltage of input terminal 11 and supplies the boosted voltage to output terminal 16.

Upon receiving judgment start signal 17a at time point t1, controller 17 instructs switch element 14 to open and instructs boost converter 12 to stop an operation of boost converter 12 at time point t1. Controller 17 detects the voltage of output terminal 16, and stores the detected voltage value as first voltage Vt1. That is, controller 17 instructs switch element 14 and boost converter 12 as described above, and detects the voltage output from output terminal 16 as first voltage Vt1.

After detecting the voltage of output terminal 16, controller 17 instructs switch element 14 to open continuously at time point t2 and instructs boost converter 12 to perform the boosting operation at time point t2. Controller 17 detects the voltage of output terminal 16, and stores the value of the detected voltage as second voltage Vt2. That is, controller 17 instructs switch element 14 and boost converter 12 as mentioned above, thereby detecting the voltage output from output terminal 16 as second voltage Vt2.

Based on voltage difference Vdp which is the difference between second voltage Vt2 and first voltage Vt1, controller 17 judges the state of boost converter 12, that is, whether boost converter 12 is in a normal state or in an abnormal state.

That is, controller 17 compares, with predetermined threshold Vth, voltage difference Vdp between second voltage Vt2 and first voltage Vt1 to judge the state of boost converter 12, that is, whether boost converter 12 is in a normal state or in an abnormal state. In the case where boost converter 12 is in a normal state and operates normally, forward voltage Vdi is generated between anode 13a and cathode 13b of connection-assist diode 13 while boost converter 12 does not perform the boosting operation. Voltage difference Vdp to be compared with threshold Vth has a value obtained by adding forward voltage Vdi to boosting step Vsu which is the voltage difference obtained by the boosting operation of boost converter 12. Hence, voltage difference Vdp to be compared with threshold Vth may have a large value, and threshold Vth can be larger accordingly. That is, the state of boost converter 12 can be judged based on large threshold Vth and large voltage difference Vdp which are not easily affected by, noises. Thus, controller 17 can stably and accurately judge whether boost converter 12 operates normally or not.

Configurations and operations of in-vehicle power supply device 10 and vehicle 9 having in-vehicle power supply device 10 mounted therein will be detailed. In-vehicle power supply device 10 mounted in vehicle 9 includes input terminal 11 and output terminal 16. Input terminal 11 is connected to secondary battery 18 while output terminal 16 is connected to load 19. That is, secondary battery 18 and load 19 are connected to each other via in-vehicle power supply device 10. Boost converter 12, connection-assist diode 13, and switch element 14 are connected in parallel to one another with respect to input terminal 11.

FIG. 1 illustrates an example of in-vehicle power supply device 10 according to the embodiment in which controller 17 is provided inside in-vehicle power supply device 10. Controller 17 is not necessarily provided inside in-vehicle power supply device 10, but may be provided outside in-vehicle power supply device 10. In this case, instead of controller 17 of in-vehicle power supply device 10, in-vehicle power supply device 10 may include a control terminal configured to be connected to controller 17 provided outside in-vehicle power supply device 10.

In the operation illustrated in FIG. 3, before time point t1, controller 17 closes switch element 14 and instructs boost converter 12 not to perform the boosting operation. Hence, before time point t1, voltage Vin of input terminal 11 is output from output terminal 16. In in-vehicle power supply device 10 according to the embodiment, switch element 14 and boost converter 12 may be in any state before time point t1.

Upon receiving judgment start signal 17a from vehicle 9, controller 17 instructs switch element 14 at time point t1 to open. Then, controller 17 instructs boost converter 12 at time point t1 to stop the boosting operation or to continuously stop the boosting operation. That is, controller 17 instructs boost converter 12 not to perform the boosting operation to boost input voltage Vin. In response to this instruction, switch element 14 opens and boost converter 12 does not perform the boosting operation. This configuration allows electric power of secondary battery 18 to be supplied to load 19 via input terminal 11, connection-assist diode 13, and output terminal 16.

At this moment, forward voltage Vdi is generated in connection-assist diode 13, and accordingly, output terminal 16 outputs voltage (Vin−Vdi) which is lower than voltage Vin output from secondary battery 18 by forward voltage Vdi. Controller 17 detects voltage (Vin−Vdi) as first voltage Vt1 and stores the value of the voltage. First voltage Vt1 is output for period P1 from time point t1 to time point t2 in which switch element 14 properly opens in response to the instruction from controller 17, and boost converter 12 properly stops the boosting operation so as not to boost input voltage Vin in response to the instruction from controller 17. At time point td1 in period P1 from time point t1 to time point t2, controller 17 detects the voltage of output terminal 16 as first voltage Vt1 (=Vin−Vdi), and stores first voltage Vt1 in, e,g, a memory.

The period in which switch element 14 opens does not necessarily coincide exactly with the period in which the boosting operation of boost converter 12 is stopped. For example, after the start of the period in which boost converter 12 stops the boosting operation, the period in which switch element 14 opens may start. The state of boost converter 12 of in-vehicle power supply device 10 is judged while vehicle 9 is not activated. Hence, the period in which the boosting operation of boost converter 12 stops, that is, the period in which boost converter 12 does not operate is included in a period in which vehicle 9 is not activated. Then, preferably in response to a trigger, i.e., judgment start signal 17*a*, the period in which switch element 14 opens starts. That is, switch element 14 which have been turned off is turned on at time point t1.

First voltage Vt1 may be stored in controller 17, or may be stored outside controller 17. Time point td1 at which controller 17 detects the first voltage of output terminal 16 delays preferably by a predetermined time from time point t1, and does not coincide with time point t1. If first voltage Vt1 is detected at time point t1, first voltage Vt1 may not be properly detected due to a momentary large voltage fluctuation as a transition. However, in the case where the voltage fluctuation as a transition is suppressed, time point td1 at which first voltage Vt1 is detected may coincide with time point t1.

At time point t2 after to the detection or storage of first voltage Vt1 of output terminal, controller 17 instructs switch element 14 to continuously open as it is, and instructs boost converter 12 to perform the boosting operation to boost input voltage Vin to second voltage Vt2. In response to these instructions, switch element 14 continuously opens, and boost converter 12 performs the boosting operation. These operations allows electric power of secondary battery 18 to be supplied to load 19 via input terminal 11, boost converter 12, and output terminal 16.

At this moment, second voltage Vt2 which is boosted by boost converter 12 and becomes higher than a voltage output from input terminal 11 via connection-assist diode 13 is supplied to output terminal 16. A period in which second voltage Vt2 is output is period P2 from time point t2 to time point t3 in which switch element 14 properly and continuously opening in response to the instruction of controller 17, and boost converter 12 properly boosts input voltage Vin in response to the instruction of controller 17. At time point td2 in period P2 from time point t2 to time point t3, controller 17 detects the voltage of output terminal 16 as second voltage Vt2, and stores second voltage Vt2.

Second voltage Vt2 may be stored in controller 17, or may be stored outside controller 17. Time point td2A at which controller 17 detects second voltage Vt2 of output terminal 16 preferably does not coincide with time point t2. This is because, if time point td2 coincides with time point t2, second voltage Vt2 may not be correctly detected due to a temporary large voltage fluctuation as a transition. However, in the case where the voltage fluctuation as a transition is suppressed, time point td2 may coincide with time point t2.

After that, based on first voltage Vt1 previously stored and second voltage Vt2, controller 17 calculates voltage difference Vdp between before and after the boosting. Voltage difference Vdp is equivalent to the difference between second voltage Vt2 and first voltage Vt1, i.e., the voltage difference between first voltage Vt1 and second voltage Vt2. Then, controller 17 compares the calculated voltage difference Vdp with predetermined threshold Vth. In the case that voltage difference Vdp is not smaller than threshold Vth, controller 17 judges that boost converter 12 is in a state capable of performing boosting to a predetermined value and boost converter 12 is in a normal state and operates normally. By contrast, in the case that voltage difference Vdp is smaller than threshold Vth, controller 17 judges that boost converter 12 is in a state incapable of sufficiently performing boosting to a predetermined value and boost converter 12 is in an abnormal state and does not operate normally.

Voltage Vin is continuously supplied to boost converter 12. Therefore, when operating normally, boost converter 12 boosts voltage Vin to second voltage Vt2. Hence, voltage difference Vdp is a value obtained by adding forward voltage Vdi to boosting extent Vsu resulting from subtracting voltage Vin of the input terminal from second voltage Vt2 resulting from boosting by boost converter 12.

This configuration allows voltage difference Vdp to be larger, and in addition, allows threshold Vth to be larger by a value equivalent to forward voltage Vdi. That is, the absolute values of voltage difference Vdp and threshold Vth can be large, accordingly being less affected by, for example, noises appearing around in-vehicle power supply device 10. As a result, it is stably judged whether boost converter 12 operates normally or not, and therefore, the accuracy of the judgment can be stably improved.

Furthermore, in accordance with the embodiment, load 19 is connected to output terminal 16, but, even if load 19 is not connected, the above-mentioned voltage difference Vdp and threshold Vth can be compared. That is, boost converter 12 can judge the state of boost converter 12 with very little power consumption.

Controller 17 instructs boost converter 12 to complete the boosting operation of boost converter 12 at time point t3 after a predetermined time elapses from time point t2. Time point t3 at which boost converter 12 completes the boosting operation may be before or after the above-mentioned calculation or judgment in controller 17.

It is beneficial that judgment start signal 17*a* is linked to various elements constituting vehicle 9. Vehicle 9 having in-vehicle power supply device 10 mounted therein will be described. Vehicle 9 includes vehicle body 9*a*, door 9*b* provided in vehicle body 9*a*, in-vehicle power supply device 10 provided in vehicle body 9*a*, secondary battery 18 provided in vehicle body 9*a*, load 19 provided in vehicle body 9*a*, engine 20 provided in vehicle body 9*a*, brake pedal 21 provided in vehicle body 9*a*, vehicle starter switch 22 provided in vehicle body 9*a*, and warning device 23 provided in vehicle body 9*a*.

Typically, when vehicle 9 restarts engine 20 from the state in which vehicle 9 is in an idling stop state to stop engine 20, in-vehicle power supply device 10 boosts the voltage of secondary battery 18, thereby stabilizing a voltage supplied to load 19. For example, in in-vehicle power supply device 10, the timing for restarting stopped engine 20 is judged on the basis of the timing of operation of brake pedal 21 by a driver. This operation is an operation of in-vehicle power supply device 10 under a state in which vehicle 9 is activated.

In contrast, under a state in which vehicle 9 and engine 20 are not activated, in in-vehicle power supply device 10, controller 17 judges the state of boost converter 12. For example, when an engine switch corresponding to vehicle starter switch 22 which have been turned on is turned off by a driver, controller 17 judges the state of boost converter 12. That is, in response to the switching of an engine switch corresponding to vehicle starter switch 22 from turning on to turning off, vehicle starter switch 22 or a predetermined section of vehicle 9 outputs judgment start signal 17*a* to controller 17. Alternatively, judgment start signal 17*a* may be transmitted and received inside controller 17.

Thus, controller 17 judges the state of boost converter 12 in a state in which the activation of engine 20 is completely stopped. Accordingly, electric power is less consumed in load 19 and consumed to a limited extent, which allows fluctuations in load 19 to have less influence on fluctuations in voltage at output terminal 16. As a result, controller 17 correctly judges the state of boost converter 12 on the basis of a voltage detected at output terminal 16.

Alternatively, for example, when a driver turns off an accessory switch corresponding to vehicle starter switch 22 which have been turned on, controller 17 may judge the state of boost converter 12. That is, in response to the switching of an accessory switch corresponding to vehicle starter switch 22 from turning on to turning off, judgment start signal 17a may be output from vehicle starter switch 22 or a predetermined section of vehicle 9 to controller 17. Alternatively, judgment start signal 17a may be transmitted and received inside controller 17.

Thus, controller 17 can judge the state of boost converter 12 while engine 20 is completely stopped and electric power is supplied only to load 19 limited by in-vehicle power supply device 10. Accordingly, electric power is less consumed in load 19 than the time when the engine switch is turned off, and consumed to a limited extent. That is, the operation of electrical equipment, such as a car audio system, functioning as load 19 mounted in vehicle 9 is stopped. Hence, fluctuations in load 19 have considerably less influence on fluctuations in voltage at output terminal 16. As a result, controller 17 can correctly judge the state of boost converter 12 based on a voltage detected at output terminal 16.

In the case where judgment start signal 17a is output in response to the switching of an accessory switch corresponding to vehicle starter switch 22 from turning on to turning off, the timing of controller's 17 detection of first voltage Vt1 can be arbitrarily judged. That is, judgment start signal 17a may be output immediately after the switching of the accessory switch from turning on to turning off, or may be output after a predetermined time elapses from the switching of the accessory switch from turning on to turning off. In particular, when judgment start signal 17a is output after a predetermined time elapses from the switching of the accessory switch from turning on to turning off, electric power is less consumed in load 19 and consumed to a limited extent, and furthermore, fluctuations in electric power is suppressed.

That is, as the time passes after the switching of the accessory switch from turning on to turning off, electrical equipment, such as a lamp, is used less frequently. Furthermore, electric power in load 19 is consumed less frequently as the time passes. Hence, fluctuations in output voltage at output terminal 16 resulting from fluctuations in load 19 are small. That is, fluctuations in load 19 have a small influence on fluctuations in output voltage at output terminal 16. As a result, controller 17 can properly judge the state of boost converter 12 based on a voltage detected at output terminal 16.

When judging that boost converter 12 is in an abnormal state, controller 17 preferably outputs a warning signal to warning device 23. In contrast, when judging that boost converter 12 is in a normal state, controller 17 preferably does not output a warning signal to warning device 23. Here, it is required to output a warning signal from controller 17 to warning device 23 at the time of the next activation of vehicle 9 with vehicle starter switch 22 by a driver. Thus, it is required for controller 17 to store the warning state from the time of the judgment that boost converter 12 is in an abnormal state until the next activation of vehicle 9.

An operation in which judgment start signal 17a is output after the stop of activation of vehicle 9 and engine 20 in response to the switching of an engine or accessory switch corresponding to vehicle starter switch 22 has been described. In contrast, judgment start signal 17a may be output to controller 17 before the activation of vehicle 9 and engine 20. Judgment start signal 17a may be output to controller 17, for example, when an operator, such as a driver or a passenger, unlocks door lock device 9c provided in door 9b by himself/herself, or unlocks door lock device 9c, for example, by a remote control key (not illustrated) while functions od vehicle 9 entirely stop. Alternatively, at this time, judgment start signal 17a may be transmitted and received inside controller 17.

In this case, typically, a long time has elapsed since the stop of activation of vehicle 9 and load 19 is not substantially present, and therefore, a voltage at output terminal 16 is detected under very stably. As a result, controller 17 can more properly judge the state of boost converter 12 based on the voltage detected at output terminal 16.

Then, when judging that boost converter 12 is in an abnormal state, controller 17 outputs a warning signal to warning device 23. In contrast, when judging that boost converter 12 is in a normal state, controller 17 does not output a warning signal to warning device 23. Here, it is required to output a warning signal from controller 17 to warning device 23 at a timing of the activation of vehicle 9 with vehicle starter switch 22 by a driver.

Switch element 14 may be implemented by a relay switch or a field effect transistor (FET) switch.

Figure 4:
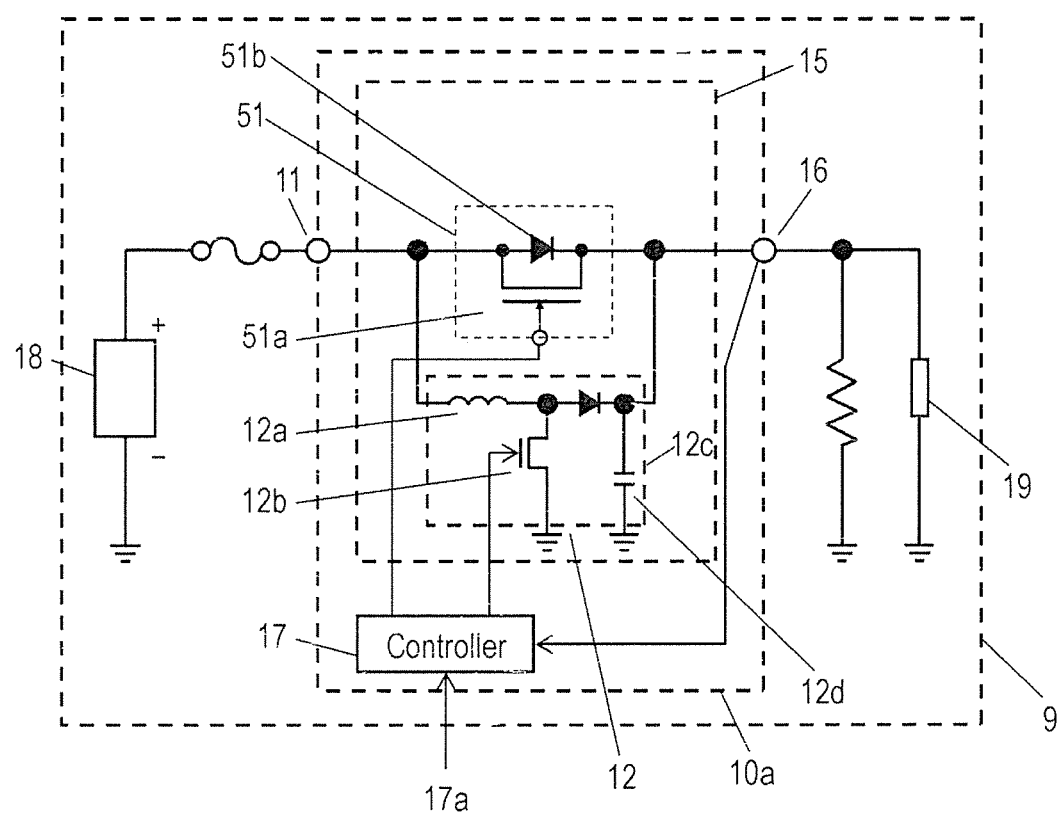
FIG. 4 is a block diagram of another in-vehicle power supply device according to the embodiment.
Figure 5:
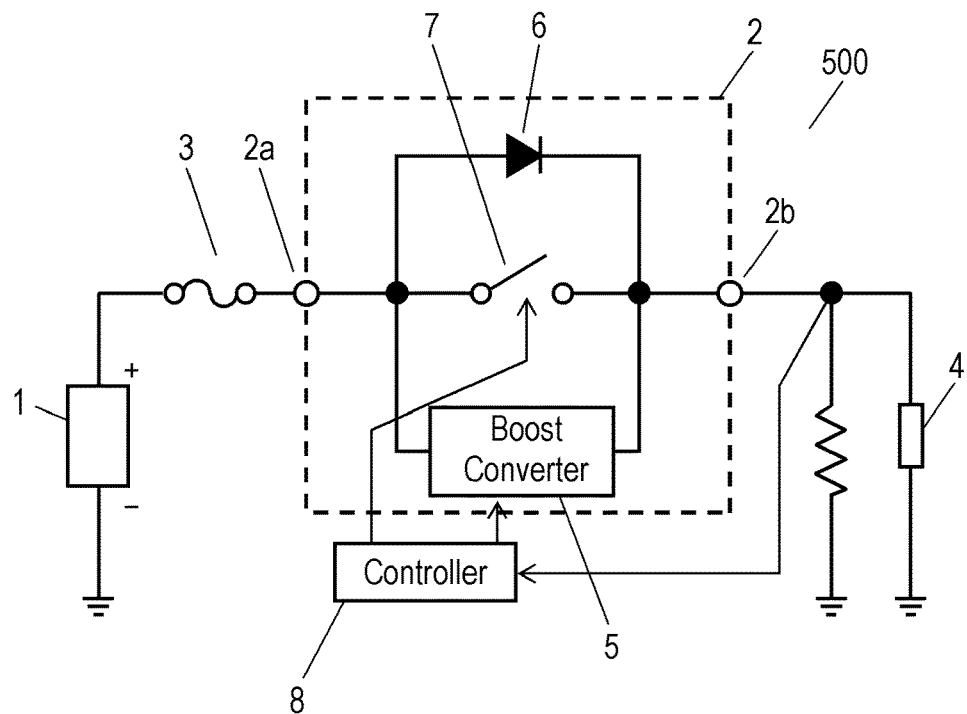
FIG. 5 is a circuit block diagram of a conventional in-vehicle power supply device.
Figure 6:
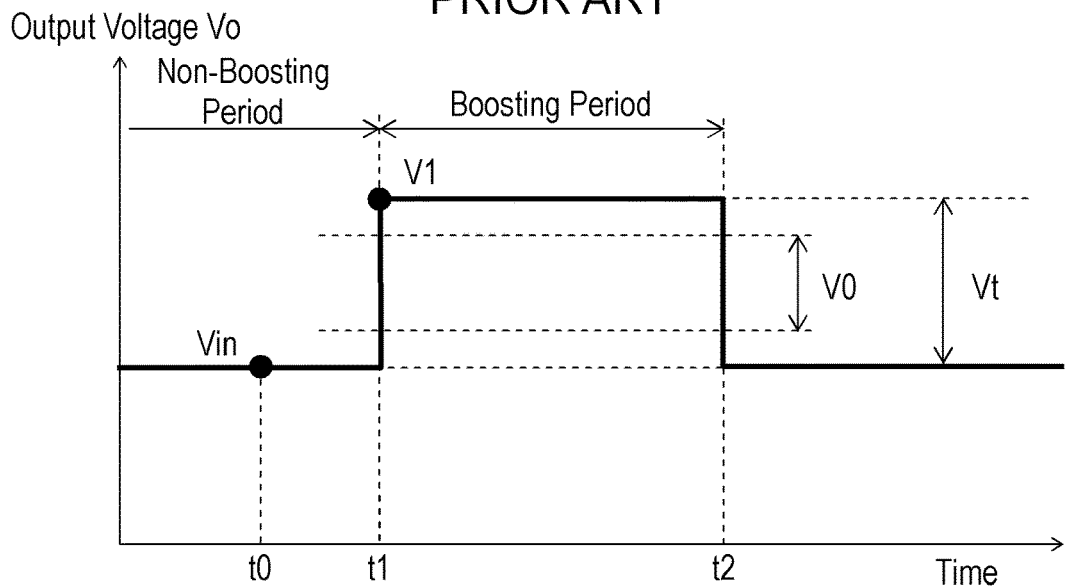
FIG. 6 illustrates an output voltage of the conventional in-vehicle power supply device.

FIG. 4 is a block diagram of another in-vehicle power supply device 10a according to the embodiment. In FIG. 4, components identical to those of in-vehicle power supply device 10 illustrated in FIG. 1 are denoted by the same reference numerals. In-vehicle power supply device 10a includes FET switch 51 including an FET and constituting switch element 14. This configuration provides in-vehicle power supply device 10a with a small size and a light weight. FET switch 51 includes switch 51a controlled by controller 17 to open and close and parasitic diode 51b connected in parallel to switch 51a. Switch 51a and parasitic diode 51b function as switch element 14 and connection-assist diode 13 of in-vehicle power supply device 10 illustrated in FIG. 1, respectively. This configuration simplifies the circuit configuration of power supply circuit unit 15. As a result, the connection reliability of in-vehicle power supply device 10a is improved.

Furthermore, FET switch 51 constituting switch element 14 allows electric power for controlling switch element 14 to be less consumed. As a result, the burden on secondary battery 18 due to the judgment operation by boost converter 12 is reduced. In addition, the operation burden on vehicle 9 to charge secondary battery 18 is reduced, accordingly improving the fuel efficiency of vehicle 9.

FET switch 51 may be either a P-type FET or an N-type FET.

INDUSTRIAL APPLICABILITY

An in-vehicle power supply device according to the present invention can stabily and accurately judge whether a boost converter operates normally or not, and is useful for various vehicles.

REFERENCE MARKS IN DRAWINGS 9 vehicle
9a vehicle body
9b door
9c door lock device
10, 10a in-vehicle power supply device
11 input terminal 12 boost converter
13 connection-assist diode
14 switch element
15 power supply circuit unit
16 output terminal
17 controller
17a judgment start signal
18 secondary battery
19 load
20 engine
21 brake pedal
22 vehicle starter switch
23 warning device
51 FET switch
51a switch
51b parasitic diode

The invention claimed is:

1. An in-vehicle power supply device comprising:
an input terminal;
an output terminal;
a power supply circuit unit including:
   a boost converter connected between the input terminal and the output terminal, and configured to perform a boosting operation to boost a voltage supplied from the input terminal, and output the boosted voltage through the output terminal,
   a connection-assist diode connected in parallel to the boost converter between the input terminal and the output terminal, and
   a switch element connected in parallel to the boost converter and the connection-assist diode between the input terminal and the output terminal; and
a controller configured to control the boost converter and the switch element,
wherein the controller is configured:
   to detect a voltage output from the output terminal as a first voltage while instructing the switch element to open and instructing the boost converter to stop an operation of the boost converter;
   to, after detecting the first voltage of the output terminal, detect a voltage output from the output terminal as a second voltage while instructing the switch element to continuously open and instructing the boost converter to perform the boosting operation; and
   to judge, based on a difference between the second voltage and the first voltage, whether the boost converter is in a normal state in which the boost converter can boost up the voltage to a predetermined value, or in an abnormal state in which the boost converter cannot boost up the voltage to the predetermined value.

2. The in-vehicle power supply device according to claim 1, wherein the switch element comprises a field effect transistor (FET) switch.

3. The in-vehicle power supply device according to claim 2, wherein the FET switch includes:
a switch configured to function as the switch element; and
a parasitic diode connected in parallel to the switch and configured to function as the connection-assist diode.

4. A vehicle, comprising:
the in-vehicle power supply device according to claim 1;
a vehicle body;
an engine provided in the vehicle body;
a secondary battery provided in the vehicle body and connected to the input terminal of the in-vehicle power supply device;
a vehicle starter switch provided in the vehicle body; and
a warning device provided in the vehicle body,
wherein the controller is configured:
   to transmit a warning signal to the warning device upon judging that the boost converter is in the abnormal state; and
   not to transmit the warning signal to the warning device upon judging that the boost converter is in the normal state.

5. A vehicle comprising:
a vehicle body;
an engine provided in the vehicle body;
a secondary battery provided in the vehicle body;
a vehicle starter switch provided in the vehicle body;
a door provided in the vehicle body;
a door lock device provided in the door;
an in-vehicle power supply device including:
   an input terminal connected to the secondary battery,
   an output terminal,
   a boost converter connected between the input terminal and the output terminal, and configured to perform a boosting operation to boost a voltage supplied from the input terminal, and output the boosted voltage through the output terminal,
   a connection-assist diode connected in parallel to the boost converter between the input terminal and the output terminal, and
   a switch element connected in parallel to the boost converter and the connection-assist diode between the input terminal and the output terminal; and
a warning device provided in the vehicle body,
wherein the controller is configured:
   to, upon detecting that the vehicle starter switch is turned off and the door lock device is switched to an unlocked state, detect a voltage output from the output terminal as a first voltage while instructing the switch element to open and instructing the boost converter to stop an operation of the boost converter;
   to, after detecting the voltage from the output terminal, detect a voltage output from the output terminal as a second voltage while instructing the switch element to continuously open and instructing the boost converter to perform the boosting operation;
   to judge, based on a difference between the second voltage and the first voltage, whether the boost converter is in a normal state in which the boost converter can boost up the voltage to a predetermined value, or in an abnormal state in which the boost converter cannot boost up the voltage to the predetermined value;
   to transmit a warning signal to the warning device upon judging that the boost converter is in the abnormal state; and
   not to transmit the warning signal to the warning device upon judging that the boost converter is in the normal state.

* * * * *